United States Patent [19]

Wells

[11] 4,443,059
[45] Apr. 17, 1984

[54] HIGH ENERGY LASER MIRROR

[75] Inventor: Jimmie D. Wells, Northridge, Calif.

[73] Assignee: The United States of America as represented by the Secretary of the Air Force, Washington, D.C.

[21] Appl. No.: 339,257

[22] Filed: Jan. 13, 1982

[51] Int. Cl.³ ............................................. G02B 5/08
[52] U.S. Cl. ................................................. 350/310
[58] Field of Search .................... 350/299, 310, 288

[56] References Cited

U.S. PATENT DOCUMENTS

| 3,817,606 | 6/1974 | Locke et al. | 350/310 |
| 3,884,558 | 5/1975 | Dunn et al. | 350/310 X |
| 3,909,118 | 9/1975 | Schmidt | 350/310 |
| 4,003,641 | 1/1977 | Heinz et al. | 350/310 |

FOREIGN PATENT DOCUMENTS

| 794105 | 9/1968 | Canada | 350/310 |

OTHER PUBLICATIONS

Barnes, W., "Hexagonal vs. Triangular Core Lightweight Mirror Structures," *Applied Optics*, vol. 11, No. 12 (Dec. 1972) pp. 2748–2750.

Primary Examiner—John K. Corbin
Assistant Examiner—Richard F. Gallivan
Attorney, Agent, or Firm—Donald J. Singer; Bobby D. Scearce

[57] ABSTRACT

A high energy laser mirror-heat exchanger is described which comprises a faceplate supporting a mirrored surface, a manifold plate adjacent the faceplate and defining a plurality of passageways for distributing fluid coolant to the adjacent faceplate surface, a heat exchanger adjacent the manifold plate having a plurality of wall members configured in a isogrid configuration which may define a plurality of triangularly shaped passageways therebetween for conducting coolant to the manifold plate the intersections of said wall members defining a plurality of insulated passageways for conducting coolant away from said manifold plate, and a backing plate attached to the heat exchanger including coolant inlet and outlet means.

2 Claims, 1 Drawing Figure

U.S. Patent  Apr. 17, 1984  4,443,059
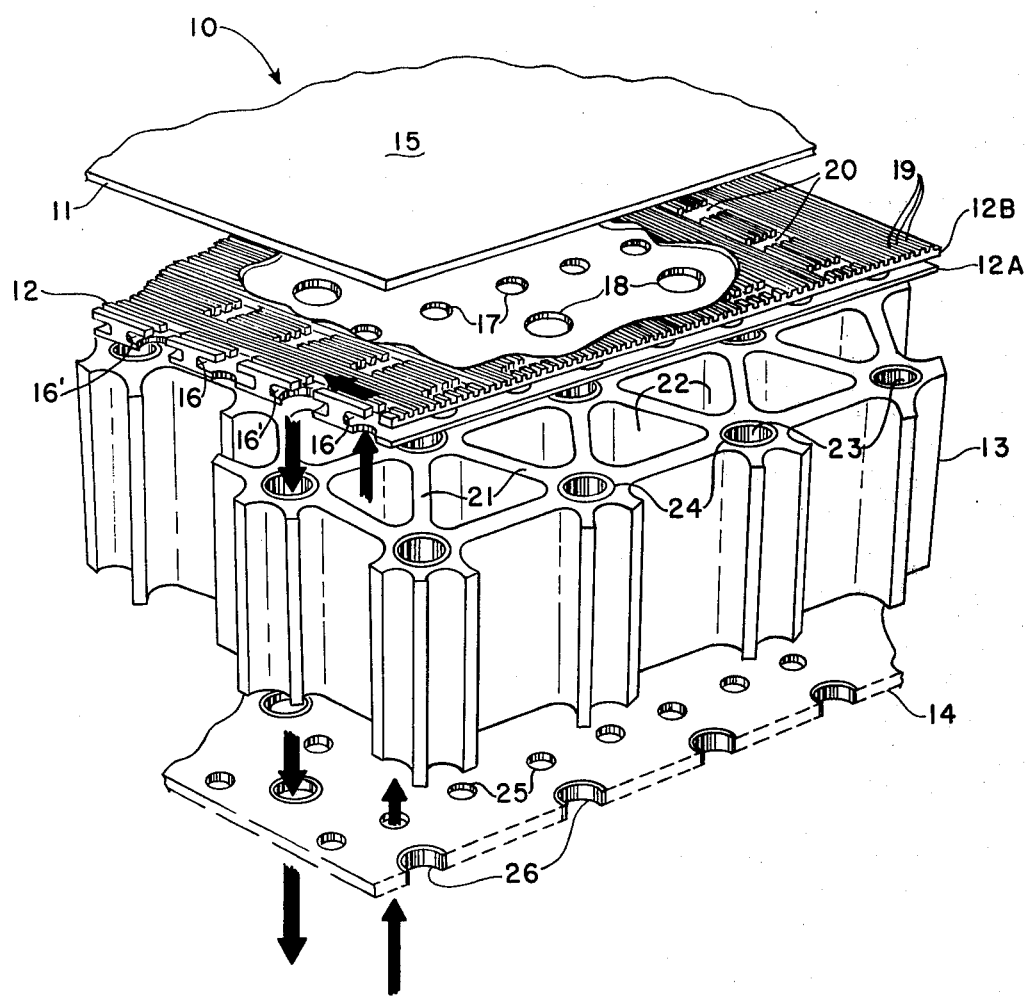

HIGH ENERGY LASER MIRROR

RIGHTS OF THE GOVERNMENT

The invention described herein may be manufactured and used by or for the Government of the United States for all governmental purposes without payment of any royalty.

BACKGROUND OF THE INVENTION

This invention relates generally to the field of optical devices for laser generating systems, and more particularly to improvements in high energy laser mirror structures including a heat exchanger comprising means to circulate fluid coolant through the mirror structure.

Laser mirrors employed in the high power density environment of a high energy laser system must, for optimum performance, be configured to be structurally stable against the thermal stresses imposed on the mirror during laser operation.

Conventional high energy laser mirrors generally have a structure comprising a thin faceplate supporting the laser mirror reflective surface, and a supporting substructure including a heat exchanger defining internal fluid coolant flow channels. Two general types of distortions of the mirror surface may arise using conventional mirror structure configurations, namely, (1) pressure-caused distortions arising from pressurized fluid coolant flow within the heat exchanger, and, (2) thermally induced distortions resulting from stresses imposed on the mirror structure by laser heating. Further, thermally induced distortions may include beinding or warping of the mirror surface because of uneven heating of the mirror surface or of thermal gradients normally existing across the thickness of the faceplate. Further, thermal distortions may result from linear growth (thermal expansion) of the mirror structure and particularly of the heat exchanger (HEX) substructure, often referred to as "HEX growth". For optimum performance of the high energy laser mirror, surface distortions or other surface deformations of the mirror's reflective contour across the surface area thereof most affected by the impinging laser beam must be maintained at a minimum, and preferably at a fraction of the wavelength of the incident laser radiation.

The invention described herein provides an improved laser mirror, particularly useful in a high energy laser environment, having a novel heat exchanger substructure for conducting coolant fluid through the mirror structure. The novel heat exchanger structure of the present invention is uniquely configured generally in a isogrid-type configuration, which exhibits high thermal conductivity, structural strength and rigidity, and which is characterized by its light weight and high resistance to thermally induced distortions. The mirror structure described herein may be configured to utilize the isogrid structure to define a plurality of fluid inlet and outlet passageways for conducting coolant near the mirror surface, and, further, may be configured to provide metered zonal cooling to the mirror surface, in order to substantially reduce the thermal effects on the mirror structure resulting from energy density variations across the profile of the impinging laser beam.

It is, therefore, an object of the present invention to provide an improved high energy laser mirror structure.

It is a further object of the present invention to provide a lightweight high energy laser mirror structure wherein thermally induced mirror surface distortion is substantially eliminated.

It is yet another object of the present invention to provide a high energy laser mirror-heat exchanger structure providing metered zonal cooling to the mirror surface.

These and other objects of the present invention will become apparent as the detailed description of a representative embodiment thereof proceeds.

SUMMARY OF THE INVENTION

In accordance with the foregoing principles and objects of the present invention, a high energy laser mirror-heat exchanger is described which comprises a faceplate supporting a mirrored surface, a manifold plate adjacent the faceplate and defining a plurality of passageways for distributing fluid coolant to the adjacent faceplate surface, a heat exchanger adjacent the manifold plate having a plurality of wall members configured in an isogrid configuration which may define a plurality of triangularly shaped passageways therebetween for conducting coolant to the manifold plate the intersections of said wall members defining a plurality of insulated passageways for conducting coolant away from said manifold plate, and a backing plate attached to the heat exchanger including coolant inlet and outlet means.

DESCRIPTION OF THE DRAWINGS

The present invention will be more clearly understood from the following detailed description of representative embodiments thereof read in conjunction with the accompanying drawing which is an exploded perspective view, partially in section, of the novel high energy laser mirror of this invention illustrating the novel isogrid core structure which characterizes the mirror's heat exchanger.

DETAILED DESCRIPTION

Referring now to the accompanying drawing, the high energy laser mirror 10 of this invention comprises four major components, namely, faceplate 11, manifold plate 12, isogrid heat exchanger member 13, and backing plate 14.

Faceplate 11 may be conventionally configured to support mirror surface 15, which may either be deposited onto or polished directly into the surface of faceplate 11 or may comprise a separate mirrored surface of the desired contour conventionally attached to and supported by faceplate 11. Typically, faceplate 11 may comprise any of a large group of materials conventionally used for laser mirror faceplates, including but not necessarily limited herein to molybdenium, tungsten carbide, tungsten, silicon carbide, silicon, or silicon nitride. Preferably, however, faceplate 11 will comprise a material having high thermal conductivity and low thermal expansion, and thermal expansion characteristics closely matching those of the materials which adjacent component parts of laser mirror 10 comprise.

Manifold plate 12 as shown in the drawing comprises the means included in the representative embodiment of laser mirror 10 shown for distributing coolant fluid into contact with faceplate 11. The manifold means 12 of the embodiment shown in representative of many varied manifold configurations useful in the novel mirror structure of the present invention. Other manifold means, as may occur to one with skill in the field of this invention, which are compatible with the heat exchanger of this invention, may be applied herein and are contemplated hereunder. Typically, manifold plate 12 may comprise molybdeum, tungsten, silicon, tungsten carbide, silicon carbide, silicon nitride or other suitable high thermal conductivity material. Manifold plate 12, as shown in cutaway in the drawing, is configured to define a plurality of manifold channels 16, 16', each having a rectangular cross-section, traversing substantially the width of manifold plate 12 and being closed at the edges of manifold plate 12. Lower surface member 12A of plate 12 has a plurality of holes therethrough to conduct coolant into and out of rectangular channels 16 and 16'. To accomplish this, alternate channels 16 are provided with a plurality of inlet holes 17, and alternate channels 16' are provided with a plurality of outlet holes 18, each set of inlet holes 17 and outlet holes 18 respectively communicating with inlet and outlet passageways in heat exchanger member 13 for conducting coolant fluid through manifold 12 in a manner hereinafter described.

Upper surface 12B of manifold plate 12 has a plurality of grooves 19 which traverse substantially the length of manifold plate 12, in a direction perpendicular to that of rectangular channels 16, and 16', and are closed at the edges of manifold plate 12, to define a plurality of small passageways when faceplate 11 is attached to plate 12. Through the upper surface member 12B are a plurality of slots 20 through which rectangular channels 16 may communicate with grooves 19, and slots 20' through which rectangular channels 16' may communicate with grooves 19. Therefore, when faceplate 11 is assembled to mainfold plate 12, a coolant fluid passage circuit is formed wherein fluid may pass through inlet holes 17 (of lower plate member 12A) into rectangular manifold channels 16, then through slots 20 to grooves 19, then to slots 20' to channels 16' and out the outlet holes 18.

The novel heat exchanger structural member 13 of the laser mirror 10 assembly, as shown in the drawing, comprises an isogrid core providing a substantially rigid honeycomb-like structure for heat exchanger member 13. The isogrid differs from normal honeycomb, in that it provides bending and tensile rigidity as well as the normal shear rigidity provided by standard honeycombs. The isogrid structure of heat exchanger member 13 comprises a network of equilateral triangular wall members 21 interconnected to define a plurality of triangularly shaped cells 22 traversing the thickness of heat exchanger member 13. At the intersections of the said network of wall members 22 may be provided a plurality of fluid conduction holes 23 also traversing the thickness of heat exchanger member 13. The walls defining each of holes 23 may be lined with heat insulating sleeve 24 or the like for purposes hereinafter described. The material of construction for heat exchanger member 13 is not critical to the invention herein so long as the said material displays acceptably high thermal conductivity and structural strength. A material, having high stiffness to weight ratio may be preferable, although any of several conventional materials including, by way of example and not of limitation, molybdenum, tungsten, silicon, tungsten carbide, silicon carbide, silicon nitride, beryllium, carbon/carbon composites, or metal matrix composites, may be acceptable. Fabrication of the novel heat exchanger member 13 may follow any of various conventional techniques, depending upon the material selected, and may include machining from solid stock, casting, pressing and sintering, plasma spraying, diffusion bonding, brazing or composite lay-up techniques. Further, heat exchanger member 13 may be of any desirable diametric size or thickness consistent with the diameter of mirror surface 15 to be supported, and may be provided as an assembly of a plurality of isogrid sections, if desired, to facilitate assembly of very large diameter mirrors. Notwithstanding, mirrors 10 having diameters of from about 5 cm to about 150 cm or greater comprising the novel structure herein described are fully contemplated hereunder.

The isogrid structure of heat exchanger member 13 as described herein exhibits the unique property of providing a lightweight structure that behaves isotropically when loaded in tension, compression or bending. Thus, unlike honeycomb type structures previously described, the novel configuration described herein and depicted in the attached drawing provides a substantially rigid bending member.

Heat exchanger member 13 may be configured and assembled such that cells 22 provide passageways for the conduction of coolant fluid to manifold plate 12 for cooling of laser mirror surface 15 and faceplate 11. Holes 23 may concomitantly provide outlets for coolant flow from manifold plate 12. Insulating sleeves 24 may be provided for holes 23 to insulate the isogrid structure from undesirable or adventitious heat flow from heated coolant back into the structure of laser mirror 10. Suitable materials for insulating sleeve 24 may include Buna N, Kel F, silicon rubber, high carbon rubber, or quartz, the selection thereof being largely a matter of design choice constrained only by a requirement of compatibility with the material selected for heat exchanger member 13 and the coolant.

Backing plate 14 may be secured to the back of heat exchanger member 13 to provide closure for heat exchanger member 13. A plurality in inlet holes 25 and outlet holes 26 may be provided through backing plate 14 at locations opposite holes 17 and 18 in manifold plate member 12A to provide means for conducting fluid coolant into and out of heat exchanger member 13 at any desirable locations, and to define a desired circuitry of coolant passage throughout heat exchanger member 13 and manifold plate 12. A source of coolant flow (not shown in the drawing) may be attached by any suitable means to inlet holes 25 to provide coolant flow to the manifold plate 12. Similarly, means (also not shown in the drawing) may be provided to communicate with outlet holes 26 in backing plate 14 to conduct the fluid coolant away from laser mirror 10.

The various components of laser mirror 10 may be assembled by any appropriate method consistent with the materials selected for faceplate 11, manifold plate 12, heat exchanger member 13 and backing plate 14. Therefore, any of various conventional methods including welding, brazing, soldering, diffusion bonding, plasma spraying, and other conventional techniques may be employed, without limiting the invention herein, to assemble the four component parts substantially as shown in the drawing.

Laser mirror 10, as assembled, may therefore provide a plurality of coolant flow circuits such as shown by the arrows in the attached drawing. The flow may enter laser mirror 10 through inlet holes 25, pass through cells 22 and inlet holes 17 (of manifold plate 12) to manifold channels 16 from which fluid is distributed through slots 20 to channels 19; fluid then exits through slots 20', manifold channels 16', outlet holes 18 (of manifold plate 12), fluid conduction holes 23 (of heat exchanger member 13), and out backing plate 14 through outlet holes 26. It should be noted that slots 20, and 20' may be configured as shown in the drawing such that all grooves 19 do not intercommunicate with each other, but may be configured in sets between corresponding pairs of slots 20 and 20'. Therefore, a plurality of individual coolant flow circuits through laser mirror 10 structure may thereby be defined, and by selectively inputting or metering coolant flow into selected inlet holes 25 of backing plate 14, it is clear that the isogrid structure as depicted in the drawing may be readily adapted to metered zonal cooling, i.e., coolant flow through selected flow circuits may be controlled so that specific desired segments of the faceplate 11 may be provided with enhanced localized cooling, if desired.

The relatively small size of grooves 19 may provide a high flow rate of coolant in contact with faceplate 11 which enhances heat exchange between faceplate 11 and the coolant.

Thermal analysis of the novel structure depicted in the drawing indicated a marked advantage of the configuration over existing structures. When fluid coolant is circulated as just described, the configuration of the present invention provides rapid quenching of manifold plate 12 and isogrid core structure 13 since the isogrid core structure of heat exchanger member 13 behaves substantially like a finned heat exchanger. Thus, structural distortions of the laser mirror 10 assembly resulting from heat penetration into the manifold plate and isogrid core are minimized.

There is, therefore, described herein an improved high energy mirror having a heat exchanger uniquely configured to provide a minimum weight structure which is resistant to distortion, in which linear growth due to temperature penetration is minimized, and which is readily adaptable to metered zonal cooling. It is understood that certain variations in structure, materials of construction and assembly techniques may be applied herein as might occur to one with skill in the field of this invention within the scope of the appended claims. Therefore, all embodiments contemplated hereunder have not been shown in complete detail. Other embodiments may be developed without departing from the spirit of this invention or from the scope of the appended claims.

I claim:

1. A high energy laser mirror structure comprising:
   a. a faceplate supporting a mirrored surface;
   b. manifold means, adjacent said faceplate, for distributing fluid coolant to said faceplate;
   c. a heat exchanger, adjacent said manifold means, comprising a plurality of interconnected wall members configured in a generally isogrid shaped structure defining therebetween a plurality of generally triangular shaped first passageways for conducting fluid coolant to said manifold means, and defining a plurality of second passageways at the intersections of said wall members for conducting coolant fluid from said manifold means; and
   d. a backing plate, attached to said heat exchanger, and including inlet means communicating with said first passageways for conducting fluid coolant into said mirror structure, and outlet means communicating with said second passageways for conducting fluid coolant out of said mirror structure.

2. The laser mirror as recited in claim 1 further comprising an insulating sleeve lining the walls defining each of said second passageways.

* * * * *